(12) United States Patent
Becker-Ross et al.

(10) Patent No.: US 7,876,435 B2
(45) Date of Patent: Jan. 25, 2011

(54) METHOD FOR DETERMINING BACKGROUND AND CORRECTION OF BROADBAND BACKGROUND

(75) Inventors: Helmut Becker-Ross, Berlin (DE); Stefan Florek, Berlin (DE); Michael Okruss, Potsdam (DE)

(73) Assignee: Leibniz-Institut fur Analytische Wissenschaften - ISAS - e.V., Dortmund (DE)

( * ) Notice: Subject to any disclaimer, the term of this patent is extended or adjusted under 35 U.S.C. 154(b) by 264 days.

(21) Appl. No.: 11/985,798

(22) Filed: Jan. 14, 2008

(65) Prior Publication Data

US 2008/0106735 A1 May 8, 2008

Related U.S. Application Data

(63) Continuation-in-part of application No. 10/416,566, filed on Oct. 3, 2003, now Pat. No. 7,319,519.

(30) Foreign Application Priority Data

Nov. 13, 2000 (DE) ................ 100 55 905

(51) Int. Cl.
    *G01J 3/28* (2006.01)
(52) U.S. Cl. .................................... 356/328
(58) Field of Classification Search .............. None
    See application file for complete search history.

(56) References Cited

U.S. PATENT DOCUMENTS 5,672,869 A * 9/1997 Windig et al. ............... 250/282

OTHER PUBLICATIONS

M.J. Pelletier; *Raman Spectroscopy Using an Echelle Spectrograph with CCD Detection*; Applied Spectroscopy; vol. 44(1990), No. 10(December); Frederick, MD, USA; pp. 1699-1705.

Sonneveld & Visser; *Automatic collection of Powder Data from Photographs*; Jour. Of Appl. Cryst., (1975) vol. 8, No. 1; pp. 1-7; (XP-002529869).

R.P. Goehner; *Background Subtract Subroutine for Data*; Analytical Chemistry, vol. 50, No. 8, Jul. 1978; American Chemical Society; p. 1223 (XP-007908639).

(Continued)

*Primary Examiner*—Tu T Nguyen
(74) *Attorney, Agent, or Firm*—James Creighton Wray; Meera P. Narasimham (57) ABSTRACT

A method to determine and correct broadband background in complex spectra in a simple and automatized manner includes carrying out a background correction with respect to broadband background before a calibration step. The background correction may involve recording a spectral graph and smoothing the recorded spectral graph, determining all values in the initially recorded graph having a value higher than the value of the smoothed graph and reducing such values to the value of the smoothed graph, and repeating these two steps. The background graph obtained is then subtracted from the initial graph. The smoothing of the graph is carried out by moving average, where each intensity value I at the position x in the spectrum is replaced by an average value. The characteristics of the found peaks can be stored in a file so that the calibration can be used at any time.

5 Claims, 8 Drawing Sheets

OTHER PUBLICATIONS

Liu & Koenig; *A New Baseline Correction Algorithm Using Objective Criteria*; Applied Specroscopy, vol. 41, No. 3, 1987; Society for Applied Spectroscopy; pp. 447-449 (XP-007908640).

S. Florek et al.; *Adaption of an Eschelle Spectrograph to a large CCD Detector*; Frescenius Jour. Of Analytic Chemistry; vol. 355, (1996); p. 269.

* cited by examiner

METHOD FOR DETERMINING BACKGROUND AND CORRECTION OF BROADBAND BACKGROUND

This application is a continuation-in-part of application Ser. No. 10/416,566 filed Oct. 3, 2003 now U.S. Pat. No. 7,319,519.

TECHNICAL FIELD

The invention relates to a method for determining background and for the correction of broadband background in a spectrum.

STATE OF THE ART

It is known to generate high resolution spectra by means of, for example, echelle spectrometers, wherein the wavelength scale is distributed on a plurality of orders. The orders are separated perpendicular to the dispersion direction of the echelle grating (main dispersion direction) by means of a further dispersing element. Examples of such arrangements are described in the article "Adaption of an echelle spectrograph to a large CCD detector" by S. Florek, H. Becker-Roß, T. Florek in Fresenius J. Anal. Chem. (1996) 355, pages 269-271. Here an echelle grating is used, where the interesting wavelengths of the UV/VIS-range are in about the $80^{th}$ order.

With such spectrometers a small spectral range is selected from the spectrum of a spectrometer with low resolution by means of an exit slit and detected with a linear diode array or the like. By the pointwise recording of the spectra one is either limited to a certain number of points or spectral ranges detected with the respective detectors, or the spectrum is shifted turning the grating and/or prism towards the detector.

More recent spectrometers are equipped with two dimensional plane detectors. They enable the simultaneous recording of the entire spectrum or at least large areas thereof. With the use of such two dimensional plane detectors it is important to know an unambiguous relationship between the wavelength and the respective pixel position and to possibly detect the entire light of one wavelength in the spectrum. This relationship is disturbed by changes of the spectrometer due to temperature changes, vibrations or the like. Furthermore the light of one wavelength is distributed on several pixels, the intensity values of which have to be added up to obtain a spectrum with a good signal-to-noise ratio. It has to be considered, that the orders are not exactly linear, but slightly curved, not parallel and not with equal distance on the detector.

The determination of the so called binning ranges for the determination of the intensity values for each respective spectral line can be achieved not only by determining the height of the image of the slit in the lateral dispersion direction but must also consider the curvature of the orders. This particularly depends from the spectrometer geometry and the properties of the optical components and can be determined only with great efforts by exact calculation of the geometric extension of the beam. Furthermore, the calculated determination of the curvature of the orders does not take into account drifts or other changes of the line positions in the exit plane due to environmental influences.

The calibration of the spectrum with an absolute relationship between the wavelengths and the intensity values is also very time consuming if carried out manually, as the interesting wavelengths are distributed on a plurality of orders and therefore an exact relationship between the wavelength and a pixel is not always available.

From the DD 260 326 it is known to arrange the optical components of an echelle spectrometer in such a way, that a secondary adjustment during the set up of the arrangement is possible. This adjustment serves to correct tolerances usually occurring at the manufacturing of the optical components. The components therefore can be manufactured with larger tolerances reducing the costs thereof. A regular compensation of drift or the like is not provided, as it would require much time.

The devices according to the known art are normally used in air conditioned laboratories, where drifts due to temperature shifts are generally small or a passive compensation of the drift by for example a thermostat was used. The use of spectrometers outside such laboratories therefore is either impossible or it requires considerable steps to achieve the stabilizing.

Broadband background disturbs the relative intensity values of spectra.

DISCLOSURE OF THE INVENTION

It is the object of the invention to provide a method to determine and correct broadband background in complex spectra in a simple and automatized manner.

Further objects of the invention will become clear from the description of the embodiments.

According to an aspect of the invention a background correction with respect to broadband background is carried out. This can be done before, for example, a calibration step. The background correction has the advantage that the relative intensities of the lines of a spectrum can be considered at, for example, the identification step. In an embodiment of the invention the background correction comprises the following steps:
(a) recording of a spectral graph and smoothing of said recorded spectral graph
(b) determining of all values in the initially recorded graph having a value higher than the value of the smoothed graph and reducing such values to the value of the smoothed graph;
(c) repeating the steps (a) to (b) at least twice,
(d) subtracting the background graph obtained in such a way from the initial graph.

Peaks which may be present in the smoothed graph are usually flatter and broader. If the values laying higher than the smoothed graph are set to the value of the smoothed graph and this procedure is repeated several times the peaks will disappear after a while and only the broadband background remains which can be subtracted from the initial graph. The broadband background can originate from non-resolved rotational-vibrational-bands of molecules, from scattered light or other quasi-continuous and continuous light sources. The height and width of the peaks superimposed on this background are not influenced by this way of correction.

The smoothing of the graph is preferably carried out by moving average. This is a method where each intensity value I at the position x in the spectrum is replaced by an average value $I_{mittel}$. The average value $I_{mittel}$ is calculated from the intensity values at the position x and the adjacent positions x±1, x±2, x±3 etc. Thereby the noise with a generally high frequency is smoothed and the peaks in a graph become flatter and broader. In an embodiment of the method the width of the moving average is twice as much of an average line width of a reference line.

The position of the peaks in the reference spectrum especially in step (b) can be determined by the steps
(b1) fixing a threshold value,
(b2) determining the maxima in the shape of the graphs above the threshold value,
(b3) selecting those maxima, where the adjacent pixels form peak flanks, which monotonously drop on both sides of the maximum to a given percentage of the maximum, and (b4) determining the center of gravity of the peak as the position of those peaks the maxima of which have been selected according to (b3).

There are further peak finding procedures known which also can be used. However, it has been found that the method described here enables a full automatization of the method without great efforts if the thresholds and the other criteria are suitably selected. It is sufficient for the purpose of the calibration to find a certain amount of peaks without using peaks with a relatively low intensity.

The order, intensity, center of gravity, maximum and line width of the found peaks can be stored in a file. In this case the calibration can be used at any time.

Further embodiments of the invention are subject matter of the subclaims. Preferred embodiments are described below in greater detail with reference to the accompanying drawing.

SHORT DESCRIPTION OF THE DRAWINGS

FIG. 6 (a)-(e) show the intensity along an order and the increasingly smoothed functions for carrying out the background correction.

DESCRIPTION OF THE EMBODIMENTS

Spectra and in particular optical spectra may be obtained in many ways. Therefore, the description below represents only one out of many ways to obtain a spectrum. The description is given by way of example only and shall not limit the scope of the invention which is defined in the appended claims. Many modifications of the inventions will become apparent to the person skilled in the art by modifying the spectrometer, the light source, the calibration and evaluating method, the detector and the like. In particular, the present invention is not limited to optical spectra or spectra obtained with echelle-spectrometer. It will be, as it becomes clear to the person skilled in the art, applicable in many spectrometric applications where line spectra are distorted by broadband background.

Figure 1:
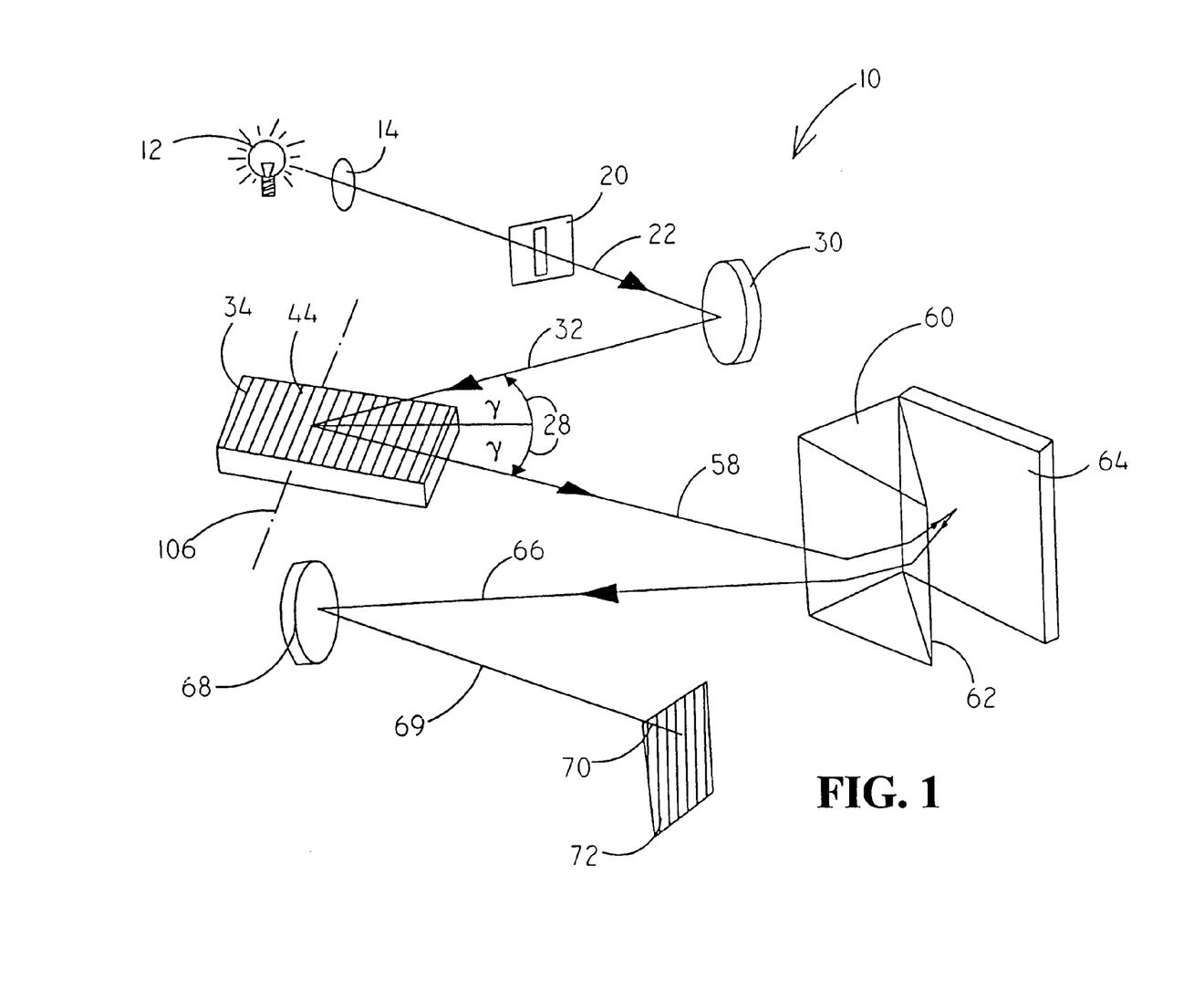
FIG. 1 schematically shows the arrangement of an echelle spectrometer with a prism in Littrow-arrangement.

In FIG. 1 an echelle spectrometer 10 according to the invention is schematically shown. The light of a light source 12 is focused by means of a lens 14 or a mirror onto an entrance slit 20. The optical axis is represented by a line 22 in FIG. 1. The light enters through the entrance slit 20 and is parallelized by means of a spherical concave mirror 30. Then the parallel bundle 32 meets an echelle grating 34 where it is dispersed. The grooves of the grating 44 run in a horizontal direction. The dispersion is perpendicular to the grooves, i.e. in a vertical direction in FIG. 1.

Figure 2:
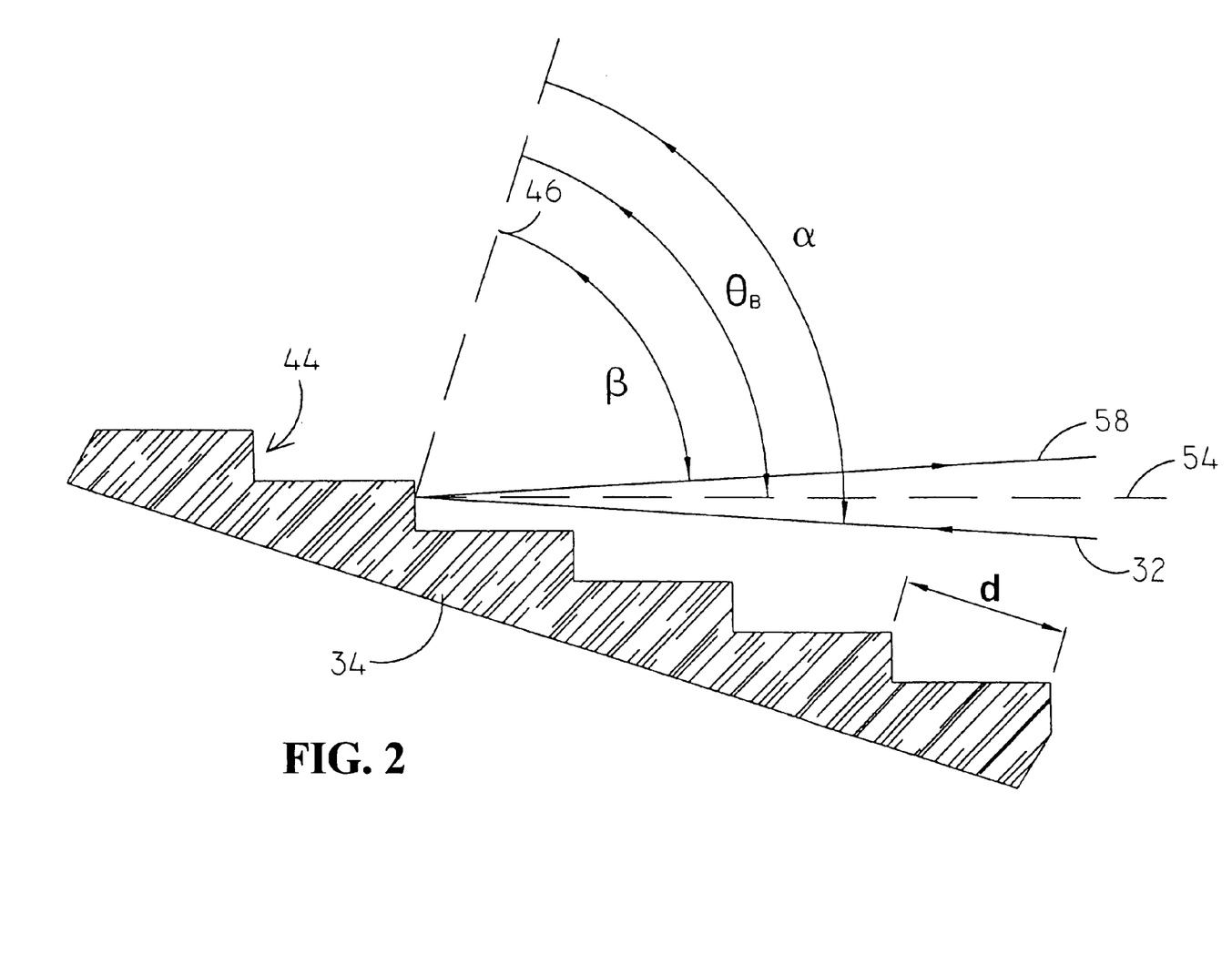
FIG. 2 shows a side view of an echelle grating.

In FIG. 2 the echelle grating 34 again is shown in greater detail. The distance between the grooves of the grating is denoted d. The angle between the incoming beam 32 and the normal line 46 on the grating is denoted $\alpha$. The angle between the diffracted beam 58 and the normal line 46 on the grating is denoted $\beta$. $\theta_B$ denotes the blaze angle of the grooves 44 of the echelle grating 34. The parallel light bundle 32 in FIG. 1 falls onto the echelle grating 34 under a very flat angle relative to the dispersion plane. The angle is almost 90 degrees minus the blaze angle of the echelle grating.

Due to the large blaze angle the intensity of the diffraction image is concentrated for the measuring wavelengths in a high diffraction order in a typical range between the $30^{th}$ and $130^{th}$ order. A high diffraction order causes a high dispersion. Also a large diffraction angle, which in the present case is 76 degrees, causes a high dispersion. The echelle grating 34 has a small number of grooves of 75 grooves per millimeter to obtain an angular dispersion for wavelengths in the range of 190 nm to 852 nm which is as high as possible. Typically 25 to 250 grooves per millimeter are used for the number of grooves. Due to the large angle of incidence the grating 34 has to be correspondingly large, if the entire light shall meet the grating.

The parallel bundle 32 meets the grating 34 under an angle 28, the so called off-plane angle relative to a plane which is perpendicular to the grooves of the grating. This is shown in greater detail in FIG. 3. There the bundle is reflected in the plane parallel to the grooves 44 of the grating and is diffracted within the dispersion plane which is perpendicular thereto.

Figure 3:
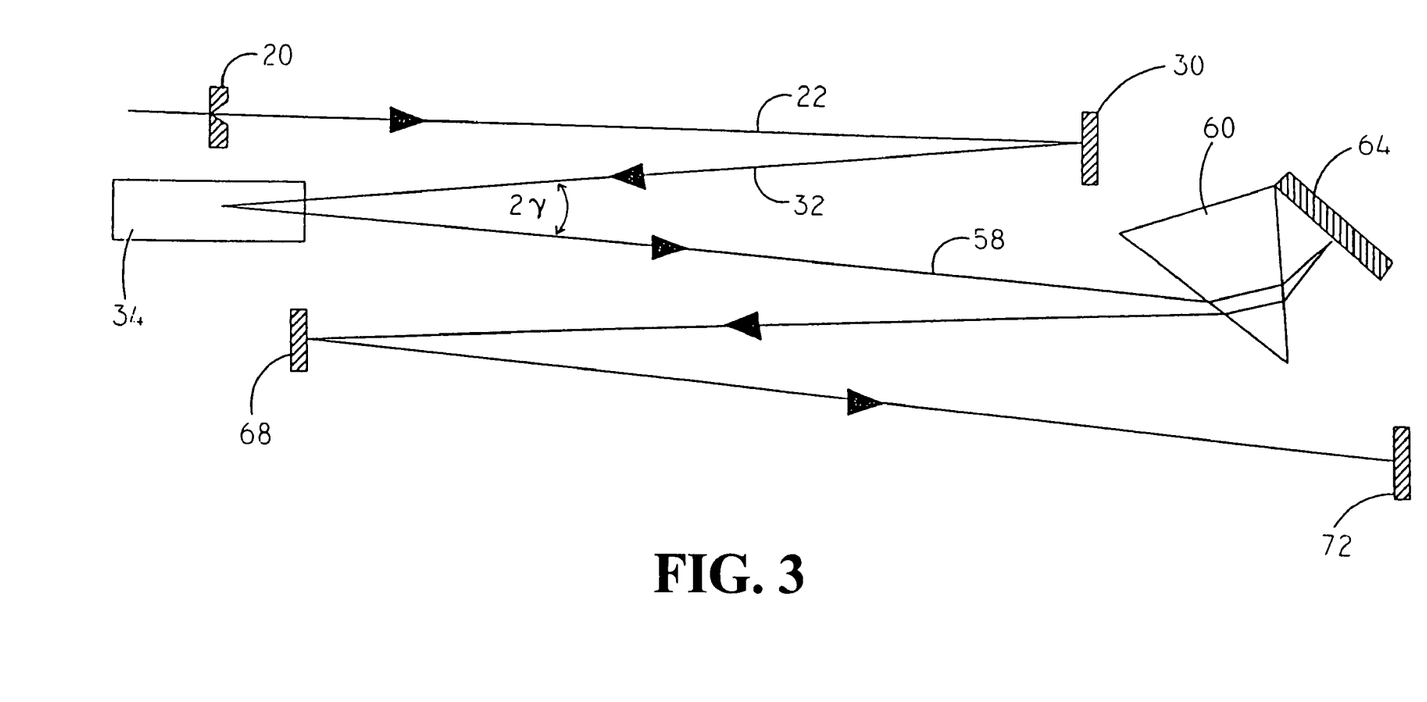
FIG. 3 is an elevated view on the light path in the echelle spectrometer of FIG. 1.

The reflected and dispersed beam 58 is guided through a prism 60 with a roof edge 62. In FIGS. 1 and 3 the edge 62 of the prism 60 runs in a vertical direction. The beam 58 is dispersed in the prism 60, meets the plane mirror 64 therebehind and is reflected back into the prism 60. There the beam is dispersed again. Corresponding to the vertical edge 62 of the prism 60 the beam is twice dispersed in a horizontal direction (lateral dispersion), i.e. perpendicular to the dispersion direction of the grating (main dispersion direction). The orders overlapping in the main dispersion direction are spaced apart and curved by the lateral dispersion of the prism 60 in a direction perpendicular to the main dispersion direction, the lateral dispersion being much smaller than the main dispersion.

After focussing the bundles 66 which are parallel for exactly one wavelength by means of a further spherical concave mirror 68 a focussed beam 69 is obtained. A two-dimensional spectrum 70 is generated in the exit plane 72.

Figure 4:
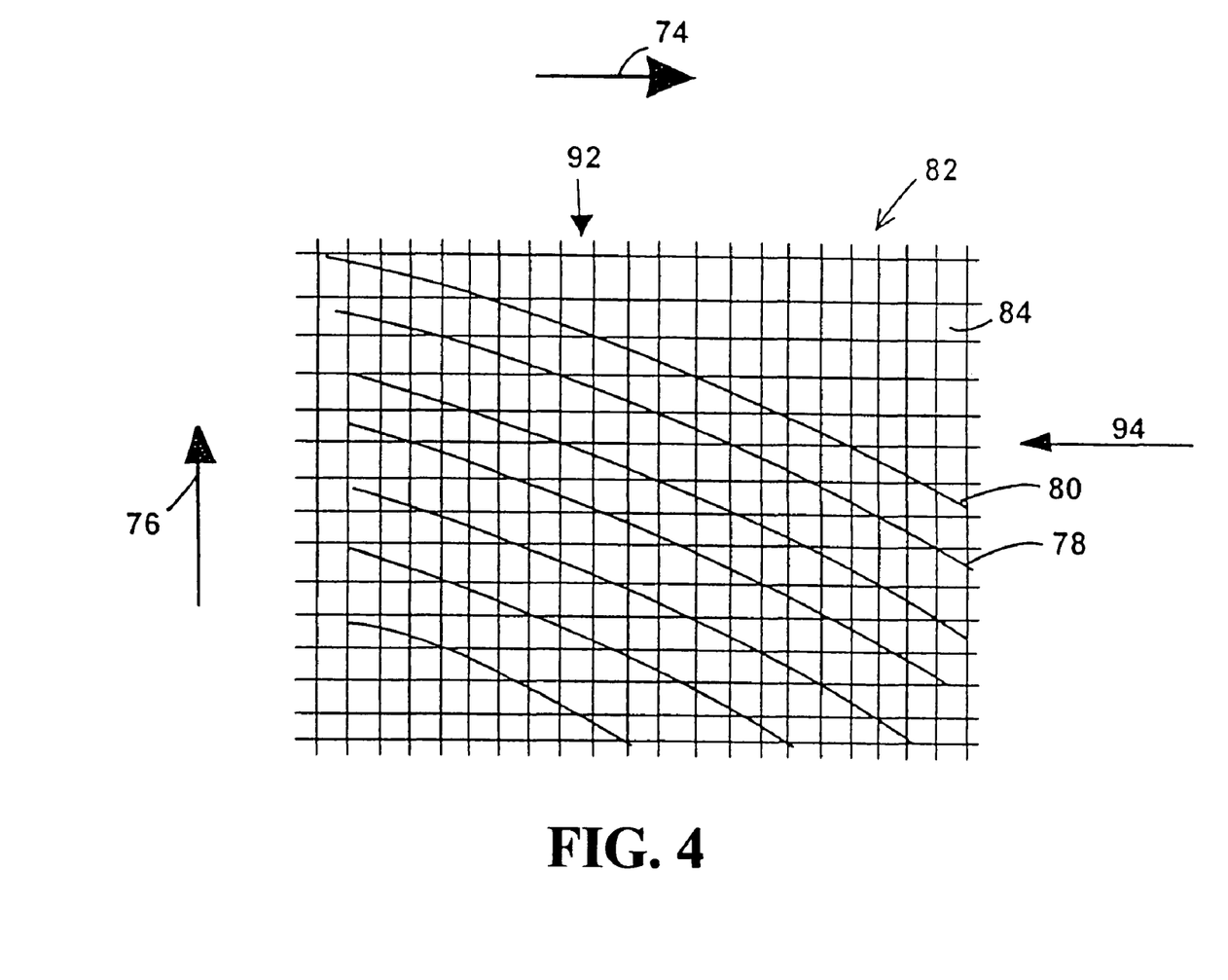
FIG. 4 schematically shows the orders of a continuous spectrum on a plane detector.
Figure 5:
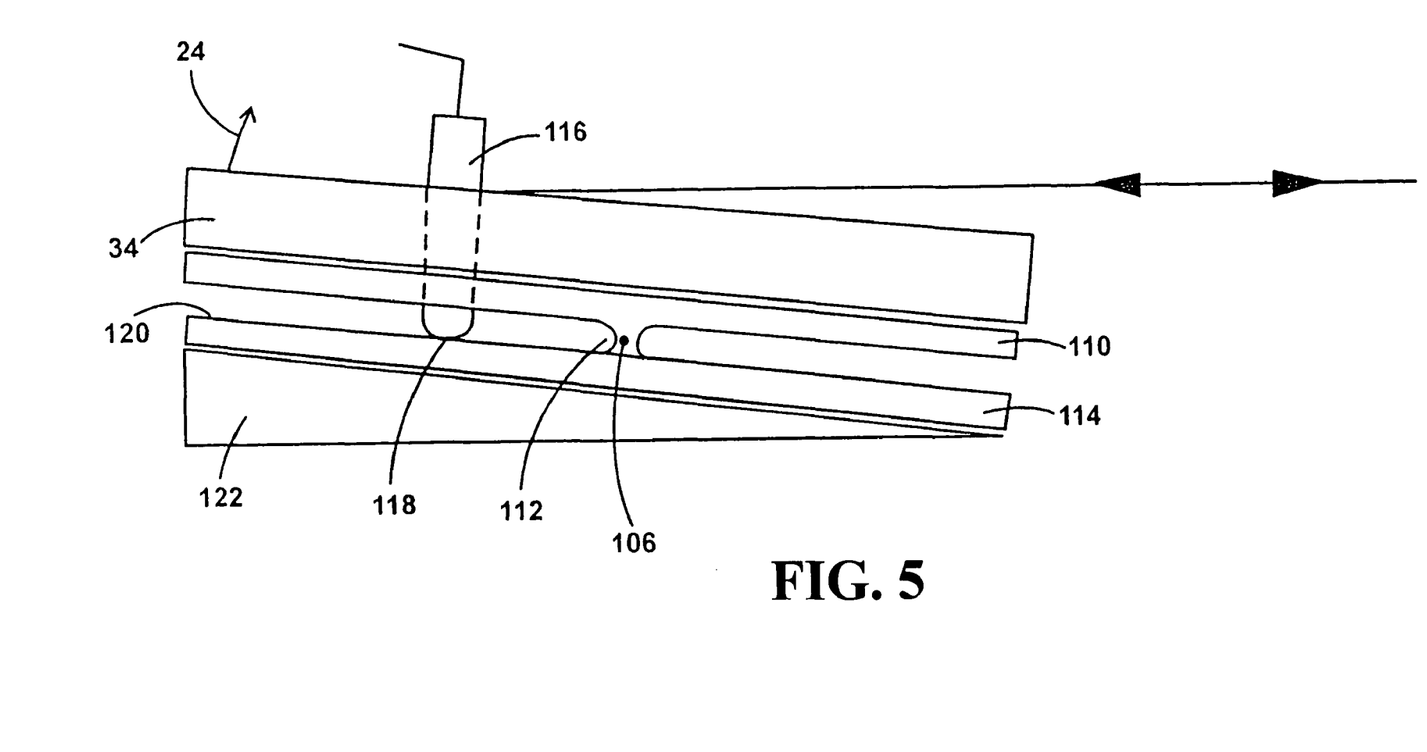
FIG. 5 shows the echelle spectrum of a line source.

A typical spectrum of a continuous light source is schematically shown in FIG. 4. The wavelengths are distributed in the main dispersion direction in the direction of the arrow 74. The various orders are spaced apart in the lateral dispersion direction represented by an arrow 76. In such way the $99^{th}$ order 78, for example, is located adjacent to the $100^{th}$ order denoted with numeral 80.

A charge-coupled-device (CCD) detector 82 with common features is arranged in the exit plane. The CCD detector is provided with picture elements 84 being arranged in a rectangular grid with horizontal detector lines 94 and vertical detector columns 92. The detector is orientated such that the detector lines 94 extend essentially along the diffraction orders of the echelle grating 34. Due to the prism dispersion, however, the diffraction orders 78, 80 are slightly curved, not parallel and not with constant distance from each other. In FIG. 4 this is shown in a slightly exaggerated manner for better demonstration.

Each picture element can be allocated to a pair (x,y) unambiguously describing its position. The x-value corresponds to the $x^{th}$ detector column from the left and the y-value corresponds to the $y^{th}$ detector line from the bottom. The grating 34 is movable about an axis 106 running parallel to the grooves 44 of the grating.

At first the spectrometer is adjusted in order to determine the intensity profile of the light from a light source 12 as a function of the wavelength (spectrum). For this purpose the profile of the orders and the position of the orders are compared to their respective reference.

Manipulating elements provided at the grating, prism, camera mirror and detector must be regularly adjusted to maintain the spectral lines over the entire spectral range in a defined reference position with a deviation of less than a pixel width. In an air-conditioned laboratory one adjustment per day usually is sufficient, while arrangements used for example outside in a mobile use have to be adjusted practically before each measurement.

For the adjustment the position of the spectral lines of the reference light source is determined and compared to the stored reference spectrum. Then the manipulating elements are activated according to a stored relationship. In a further step the position of the spectral lines is checked again. If the spectral lines are within a given interval around the reference position the spectrometer is in the "reference condition". However, the relationship possibly is not perfect. This can be due to non-linearities or due to the rotation axes not being in their optimum position. The spectral lines will then be closer to their reference position but not directly on it. Therefore the adjusting procedure is repeated until all spectral lines are at their reference positions. Depending on the quality of the relationship and the manipulating elements only one up to as many as 100 repetitions can be necessary. Afterwards all spectral lines can be found at their reference positions. The spectrometer then has a very exactly defined resolution. The arrangement is also suitable for the "online"-stabilization. An adjustment is then carried out in regular short intervals.

In order to obtain a good signal-to-noise ratio the intensities of those detector elements illuminated with light of the same wavelength are added up (binning). First of all the detector elements which belong together are determined. These "binning ranges" run about perpendicular to the orders which are curved due to the prism dispersion.

Determining the binning ranges for the real measurement the picture elements are considered proportionally but column-wise discrete. The binning range represents the range between two minima and correspondingly the intensity values are added up. By this procedure one obtains a two dimensional intensity distribution (I(x,y)) of a group of one dimensional spectra $I_m(x)$, wherein m denotes the order.

To obtain the function $I(\lambda)$ which is the one interesting to the spectroscopist, $I_m(x)$ has to be calibrated. For this purpose a wavelength $\lambda$ has to be allocated to each position x of the binned spectrum. Therefore, first the function $\lambda_m(x)$ is sought.

The calibration is effected by comparison of the measured spectrum to a reference spectrum, which has been measured with a line emitting source with a large amount of spectral lines. A section of such a spectrum is shown in FIG. 6 and FIG. 7. In the UV-range between 200-350 nm the platinum lines are particularly suitable. The line data are already present in the form of a file (folio). In this file the wavelengths of the centers of gravity of the lines and the relative intensities are stored. In the range between 650 nm-1000 nm the noble gas lines of a Pen-Ray-lamp are suitable, where the spectra were added up by software.

Figure 6A:
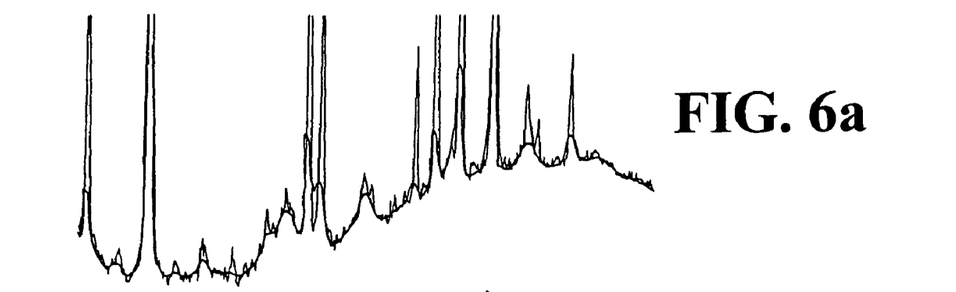
Figure 6B:
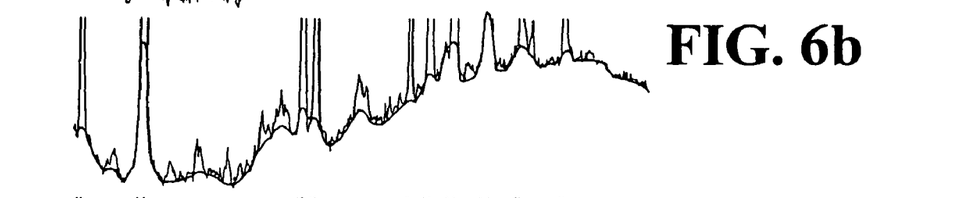
Figure 6C:
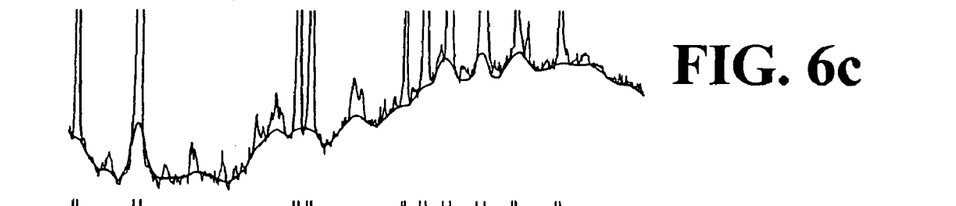
Figures 6D, 6E:
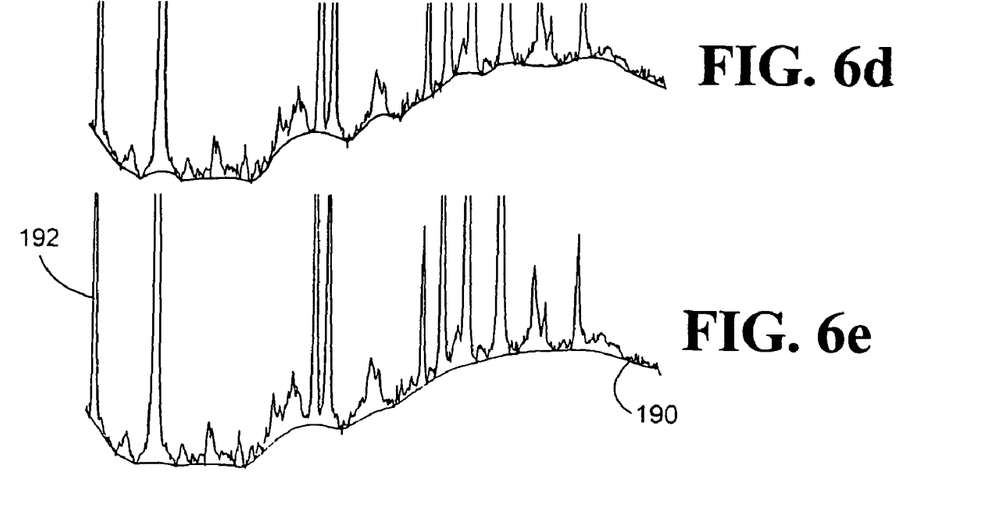

First, the recorded spectrum is corrected for broadband background. In FIG. 6*e* the background is denoted with numeral 190. The spectral lines are denoted with numeral 192. The broadband background originates, for example, from scattered light, non-resolved rotational-vibration-bands of molecules or the like.

There are several background correction methods. Usually the background is first determined and then subtracted from the initial spectrum. For the determination of the background the function $I_m(x)$ is smoothed by moving average. This means that at each point x the intensity I(x) is replaced by the average $$\bar{I}(x) = \frac{\sum_{v}^{v_{max}} I(x_v)}{v_{max}}$$

The width $v_{max}$ of the moving average corresponds to about double of a line width. If the average line width is about 5 pixels, then $v_{max}=10$. For the smoothed function each value of the initial graph being higher than the value of the smoothed graph is set to the value of the smoothed graph.

In the next step the such modified graph again is smoothed with moving average. Again after this repeated smoothing of the modified graph the graph is again modified by setting the values being higher than the value of the smoothed graph to the value of the smoothed graph. The result of a 2-fold smoothing is shown in FIG. 6*a*. It can be seen that the peaks shrink while the rest of the smoothed graph fits well to the initial graph.

The smoothing procedure and the setting of the values at the peaks is repeated 100 times. The initial values and the graphs with 5-times, 10-times, 50-times and 100-times repetition are shown in FIG. 6*b* to FIG. 6*.e*. In the end the smoothed graph represents the initial graph without peaks, i.e. it describes the broadband background.

Figure 7A:
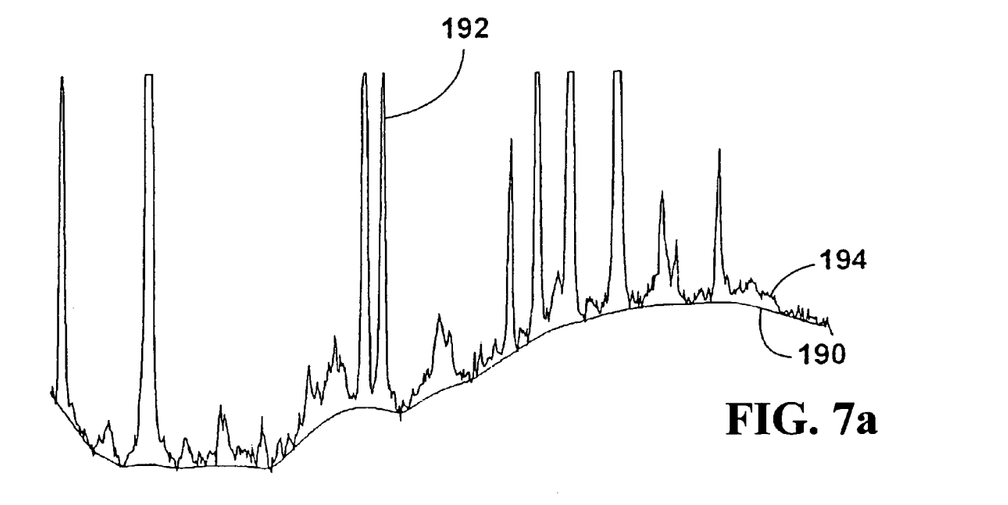
FIG. 7a shows the intensity along an order and the computed background.
Figure 7B:
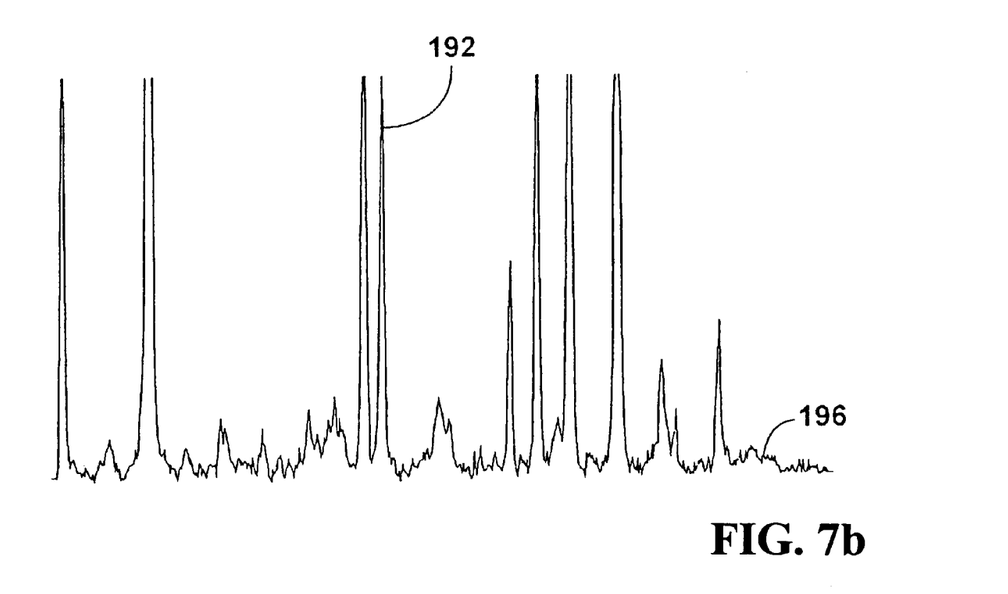
FIG. 7b shows the background corrected intensity along an order.

In FIG. 7*a* the background 190 and the initial curve 194 with peaks 192 is shown. In the next step the correction is carried out by subtracting the background from the initial graph. The graph of the difference 196 is shown in FIG. 7*b*. It can be seen that apart from noise only the peaks 192 are present in the spectrum. the binned and background corrected graph can then be used for further calibration.

Figure 8:
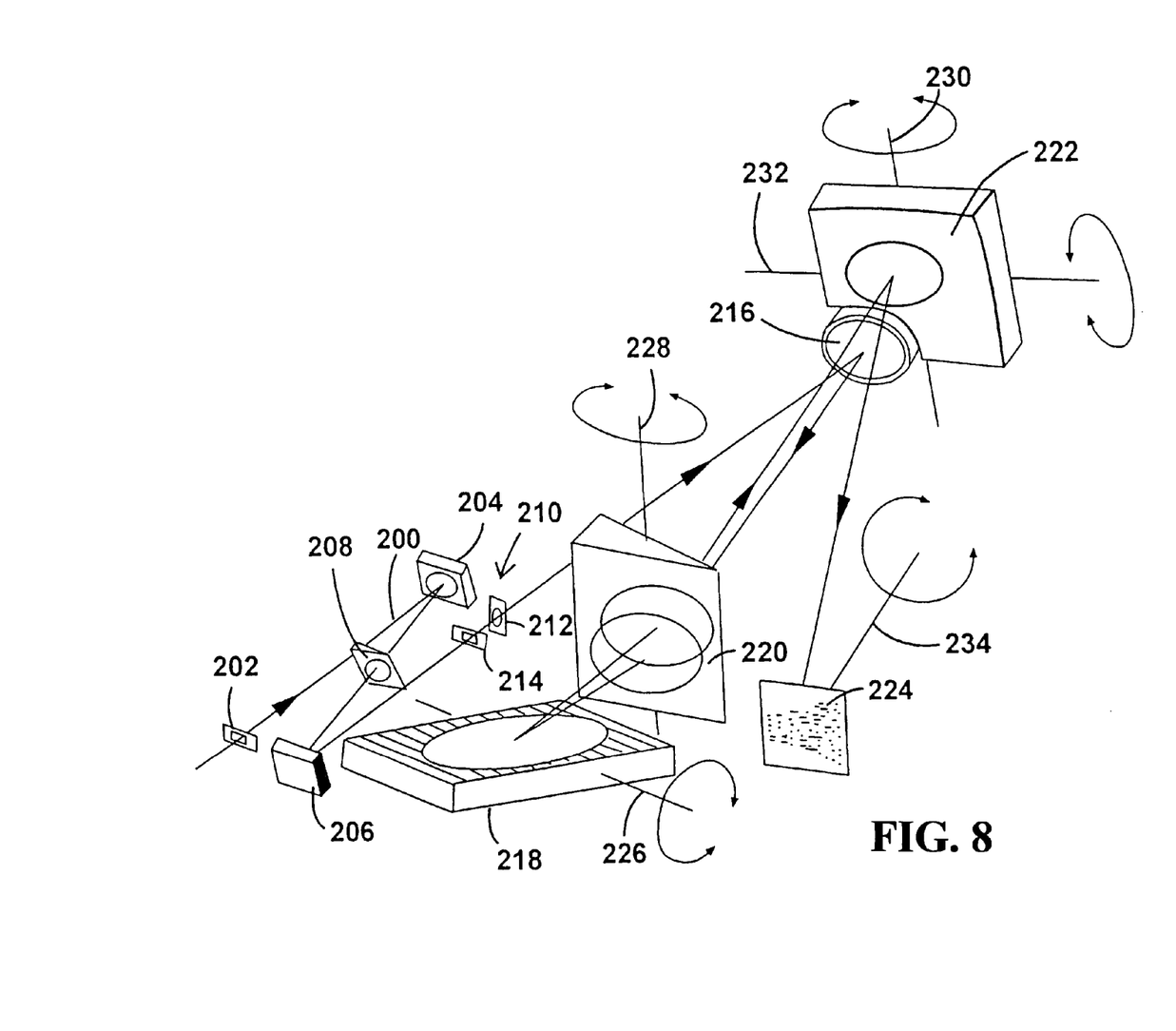
FIG. 8 shows an echelle spectrometer according to a different embodiment.

In FIG. 18 an echelle spectrometer according to another embodiment is shown. The light, represented by the optical axis 200 is pre-dispersed before entering the spectrometer. For this purpose an arrangement consisting of the entrance slit 202, UV-coated toroid mirrors 204 and 206 and a prism 208 is provided. The light enters the entrance slit arrangement 210 with two perpendicular, shifted entrance slits 212 and 214. A collimating mirror 216 in the form of a spherical mirror reflects the bundle in the direction of the echelle grating 218. Between the echelle grating 218 and the collimating mirror 216 a prism is arranged for lateral dispersion. After the dispersion at the grating 218 the light again goes through the prism and falls onto the camera mirror 222. The camera mirror 222 focuses the dispersed light in the exit plane 224.

The grating is rotatably mounted about an axis 226. The prism is rotatably mounted about an axis 228. The camera mirror is rotatably mounted about the two axes 230 and 232 and the detector (not shown) is rotatably mounted about an axis 234. By this arrangement the adjustment of the spectrum in the exit plane to a reference position is possible in a similar way as with the first embodiment.

The invention claimed is:
1. Method for determining background and correction of broadband background for spectrometers, comprising the steps of:
(a) recording of a spectral graph with a spectrometer and smoothing of said recorded spectral graph
(b) determining of all values in the initially recorded graph having a value higher than the value of the smoothed graph and reducing the values to the value of the smoothed graph;
(c) repeating the steps (a) to (b) at least twice,

(d) subtracting the background graph obtained, resulting in a background corrected graph from the initial graph and using the background corrected graph in the spectrometer.

2. Method according to claim 1, wherein the smoothing of the graph is carried out by moving average, and wherein the width of the moving average is twice as much of an average line width of a reference line.

3. Method according to claim 1, wherein the determined values having the value higher than the smoothed graph in step (b) above are peaks and wherein positions of the peaks in any reference spectrum are determined by the steps of:

(b1) fixing a threshold value, (b2) determining maxima in the shape of the graphs above the threshold value, (b3) selecting those maxima, where adjacent pixels form peak flanks, which monotonously drop on both sides of the maximum to a given percentage of the maximum, and (b4) determining a center of gravity of the peak as the position of those peaks the maxima of which have been selected according to (b3).

4. Method according to claim 3, further comprising first lines in a middle of orders and wherein an order of said first lines is determined from a diffraction grating parameter.

5. Method according to claim 4, wherein a fitting function is a polynomial function of second or third order and a wavelength scale is stored in the form of fitting parameters of a secondary fitting function describing corresponding fitting parameters of each order.

* * * * *